T. C. HOOKER.
Improvement in Harrows.
No. 132,964. 　　　　　　　　　　　Patented Nov. 12, 1872.
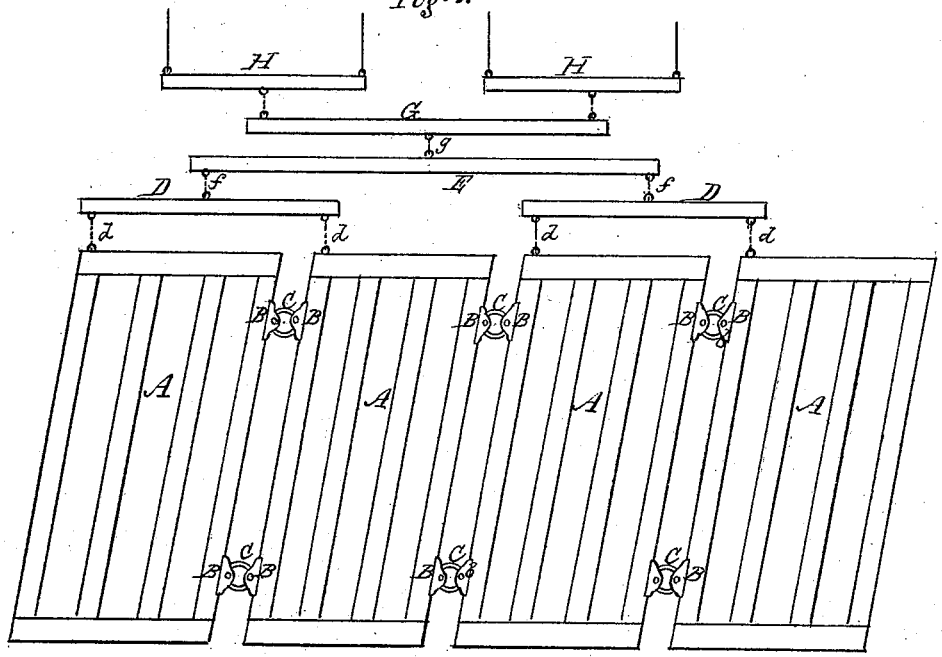
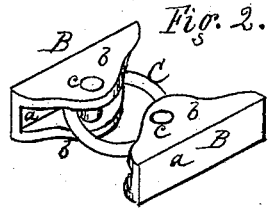
Witnesses.
Fred. A. Hatch
Archie Baines
Inventor.
Thos. C. Hooker,
pr R. F. Osgood,
atty.

UNITED STATES PATENT OFFICE.

THOMAS C. HOOKER, OF BROCKPORT, NEW YORK.

IMPROVEMENT IN HARROWS.

Specification forming part of Letters Patent No. 132,964, dated November 12, 1872.

*To all whom it may concern:*

Be it known that I, THOMAS C. HOOKER, of Brockport, in the county of Monroe and State of New York, have invented a certain Improvement in Harrows, of which the following is a specification:

Nature of the Invention.

The object of this invention is to allow a gang of harrows to have a universal movement, each independent of the others; and it consists of the ring-joints, operating in the manner and for the purpose hereinafter set forth.

General Description.

In the drawing, Figure 1 is a plan, and Fig. 2 a perspective view, of one of the ring-joints.

A A A A represent four harrows, arranged in a gang side by side, and preferably standing in an angular direction to the line of motion, as shown. These harrows are connected either at the middle or at the ends, or both, by ring-joints constructed as follows: B B are bearings attached to the inner sides or tops of the harrows opposite each other. These castings consist each of a way, $a$, of considerable length, and of two flanges, $b$ $b$, at top and bottom, respectively, which thus form a box to receive the ring. Through the projecting ends of the flanges $b$ passes a pin or bolt, $c$. The ring C rests in the box-bearings thus formed, and is held by the pin $c$. The draft attachment is as follows: To the front end of each harrow of the gang is attached a chain, $d$, making four in all. Each pair of chains connects with a whiffletree, D. With these two whiffletrees connects an "evener," E, by means of the chains or connections $f f$. With this "evener" connects the ordinary doubletree or "evener" G by a single central connection, $g$; and to this double-tree, in turn, are attached the ordinary outer whiffletrees H H.

The object sought by the above-described arrangement of the ring-joints and draft attachment is to allow the several harrows forming the gang a freedom of movement in every direction. This cannot be accomplished by the ordinary whiffletrees and "evener," since the evener is next to the harrows, and connects with all in a single length, and draws them stiffly and rigidly by an unvarying movement, and without allowing any longitudinal play or falling back; but by the use of two whiffletrees next the harrows it will be seen there is a flexible connection with each which will allow each harrow to yield either longitudinally or transversely without affecting its fellows. Such an arrangement is of much importance in passing over rough ground, as the harrows will readily clear of any obstruction, or, if stopped, they will not produce a sudden shock on the team. The ring-joints are especially designed also to facilitate this movement. The rings are confined between the opposite box-bearings B B, and act similarly to wheels or friction-disks, rolling back and forward upon the ways $a$ $a$, with which they are in contact, accordingly as the harrows work forward or back under motion. They thus prevent friction, and serve as stays or gages to preserve the proper separation of the several harrows. This special anti-friction movement, by the rolling of the rings on the ways, I regard as one main novelty in my invention.

I am aware that links forming a loose hinge or joint, and other devices which form a loose connection, have before been known; but I am aware of none where rings forming the loose connection have been used embodying the additional function of staying the harrows and rolling against the opposite surfaces to prevent friction. The bearings B are also specially constructed to insure this action. The ways $a$ $a$ are made plane and of the proper length to allow the rolling movement of the rings. The projections $b$ $b$ are made only in the middle, and graduate off toward the ends, so as to allow the rings to be turned up over them when the harrows are raised. By this means the rings are held in the proper horizontal plane when rolling, but are allowed to turn over in elevating the harrows.

Any number of harrows may be employed, and the ring-joints, if used in the center alone, may be employed with other kinds of flexible joints at the ends of the harrows. Instead of the form of whiffletrees before described, the two end harrows may be attached to the ends of the evener, and the two center harrows may be attached to a single whiffletree in the center of the evener. The same universal action of the harrows is attained in either case.

I am aware that a patent has been granted to Samuel Mendenhall dated March 23, 1869, for harrows, in which an elevated coupling is employed to connect the two harrows, and I therefore lay no claim to such invention, as in the said coupling of Mendenhall a plate with perforations to receive hooks is employed which is incapable of having a rolling motion, as described in my invention.

I do not claim, broadly, a gang of harrows, nor flexible joints between them; but

What I claim, and desire to secure by Letters Patent, is—

The harrows A A, provided with bearings B B, having horizontal flanges and vertical pins $c$ $c$, in combination with the horizontal rings C C, having a rolling motion in said bearings, and preserving a uniform and parallel distance between the harrows, all arranged, constructed and operated, as and for the purpose set forth.

In witness whereof I have hereunto signed my name in the presence of two subscribing witnesses.

T. C. HOOKER.

Witnesses:
  H. W. BARNES,
  A. C. HOOKER.